United States Patent
MacIntosh

(10) Patent No.: US 9,484,725 B2
(45) Date of Patent: Nov. 1, 2016

(54) ACCESS PLATE ADAPTER FOR ELECTRICAL FIXTURE

(71) Applicant: Hubbell Incorporated, Shelton, CT (US)

(72) Inventor: W. Kenneth MacIntosh, Ivyland, PA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/789,693

(22) Filed: Jul. 1, 2015

(65) Prior Publication Data

US 2015/0303667 A1 Oct. 22, 2015

Related U.S. Application Data

(63) Continuation of application No. 13/280,638, filed on Oct. 25, 2011, now Pat. No. 9,300,122.

(51) Int. Cl.
*H05K 7/02* (2006.01)
*H02G 3/20* (2006.01)
*H02G 1/00* (2006.01)

(52) U.S. Cl.
CPC . *H02G 3/20* (2013.01); *H02G 1/00* (2013.01)

(58) Field of Classification Search
CPC .......... H02G 3/20; H02G 1/00; F21V 21/03; F21V 21/02
USPC ............. 361/679.01, 807; 200/3.2, 3.3, 4.02, 200/200; 438/535, 536, 537
See application file for complete search history.

(56) References Cited

U.S. PATENT DOCUMENTS

| | | | |
|---|---|---|---|
| 3,356,840 A | 12/1967 | Cohen | |
| 4,368,506 A | 1/1983 | Rapp | |
| 6,858,802 B2 | 2/2005 | Hagarty et al. | |
| 7,048,575 B2 | 5/2006 | Kidman | |
| 7,347,580 B2 | 3/2008 | Blackman et al. | |
| 7,494,371 B2 | 2/2009 | Kidman | |
| 7,683,257 B1 | 3/2010 | Shotey et al. | |
| 7,838,769 B2 | 11/2010 | Peck | |
| 8,445,780 B1 | 5/2013 | Robins | |
| 2006/0101741 A1 | 5/2006 | Rae | |
| 2010/0077681 A1 | 4/2010 | McCleskey | |
| 2011/0116276 A1 | 5/2011 | Okamura et al. | |

OTHER PUBLICATIONS

Notice of Allowance and Fees Due from the United States Patent and Trademark Office for U.S. Appl. No. 13/280,638 dated Mar. 5, 2015 (5 pages).
Final Office Action from the Untied States Patent and Trademark Office for U.S. Appl. No. 13/280,638 dated Nov. 17, 2014 (8 pages).

*Primary Examiner* — Bernard Rojas
(74) *Attorney, Agent, or Firm* — Michael Best & Friedrich, LLP

(57) ABSTRACT

An electrical assembly, such as a lighting assembly, includes a housing adapted for mounting to a wall or ceiling. The housing has an outer wall for attaching to the wall or ceiling and an opening for wire connections between the housing and the power source. An access plate adapter is removably coupled to the opening in the housing to define a channel between the housing and the wall or ceiling. The adapter has a bottom wall and a side wall forming a well and an outwardly extending top wall at a top end of the side wall. The bottom wall has as plurality of tabs forming hooks for coupling with the opening in the housing wall. The top wall of the adapter has a dimension to contact the surface of the wall or ceiling and form a seal to define a closed channel between the housing and the wall or ceiling.

22 Claims, 5 Drawing Sheets

ACCESS PLATE ADAPTER FOR ELECTRICAL FIXTURE

FIELD OF THE INVENTION

The present invention is directed to an electrical assembly such as a lighting assembly or fixture and an access plate adapter that can contact the surface of a wall or ceiling. The invention is particularly directed to an access plate adapter for closing the access opening in the electrical assembly and forming an electrical seal with the wall or ceiling to carry electrical wiring between the electrical assembly and the space above the ceiling or behind the wall.

BACKGROUND OF THE INVENTION

Electrical assemblies such as lighting fixtures generally have an access opening in the housing to feed wiring to the power source or to an electrical juncture box. The housing can have a cable connector coupled to the opening in the housing to clamp the electrical cable to the housing.

Various cover plates are provided with the electrical assembly that can be removed from the housing to make the necessary electrical connections during installation. The cover plates are generally flat or shaped to conform to the housing and can be attached to the housing by hooks, tabs, fasteners, or a combination thereof.

Many electrical devices and assemblies are known in the art that have removable cover plates and access plates. For example, U.S. Pat. No. 3,356,840 to Cohen discloses a light fixture mounting assembly having a ring with a flange that engages the top surface of the ceiling and a cylindrical side wall that extends through the opening in the ceiling. A U-shaped yoke member is attached to the ring by hooking onto the edges of the ring.

U.S. Pat. No. 7,683,257 to Shotey et al. discloses an electrical cover plate having a frame with an adapter plate recessed in the frame. The adapter plate couples with the frame and has a size to fill the recess.

U.S. Pat. No. 7,494,371 to Kidman discloses a face plate for connecting to an electrical box. The electrical box includes an anchor that is removably attached thereto for supporting the electrical wiring device. The cover is snapped to the anchor by projections that extend through an opening in the anchor.

U.S. Pat. No. 7,437,580 to Blackman et al. discloses an adapter device for mounting a ceiling light fixture. The adapter is a plate-like member having bendable tabs that extend through the opening in the ceiling where the tabs are bent to grip the ceiling. The adapter includes legs for temporarily supporting the light fixture while being connected to the electrical box.

U.S. Patent Publication No. 2011/0116276 to Okamura et al. discloses a mounting assisting adapter member for a lighting apparatus. The adapter includes a ring with a recessed portion that fits within the opening in the ceiling. The lighting assembly is hooked to the rim by spring tabs. The ring is secured to the ceiling by top flanges that are folded over onto the inner surface of the ceiling.

U.S. Patent Publication No. 2006/0101741 to Rae discloses a recessed lighting fixture adapter for mounting a recessed light in a ceiling or wall. The adapter includes an inner plate and an outer plate and engages opposite surfaces of the ceiling. The inner and outer plate are connected together by screws which draw the plates together to clamp to the ceiling. The inner and outer plates have an opening to receive the recessed lighting fixture.

U.S. Pat. No. 7,048,575 to Kidman discloses a mounting assembly for a low voltage terminal. The assembly includes a base that fits into the opening in the wall and receives a body for supporting the low voltage terminal. A cover plate is attached to the body by screws.

While these devices are suitable for their intended use, there is a continuing need in the industry for improved mounting assemblies and access cover plates.

SUMMARY OF THE INVENTION

The present invention is directed to an electrical assembly and to an access plate that is removably coupled to the electrical assembly. In particular, the invention is directed to an electrical assembly having an access plate that extends between the electrical assembly and a wall or ceiling surface.

The electrical assembly of the invention can be a lighting assembly or fixture that can be mounted to a wall or ceiling using various fasteners, mounting brackets, hangers, and the like. The housing includes an access opening or a knockout that can be removed to form an access opening. The access opening in the housing includes a removable access plate.

Accordingly, one aspect of the invention is to provide an electrical assembly with a removable access plate that is coupled to the housing of the electrical assembly and that is able to contact the surface of the wall or ceiling. The access plate of the invention is particularly suitable for use where the electrical assembly is spaced from the mounting surface so that the access plate closes the gap between the access opening in the electrical assembly and the opening in the mounting surface.

Another feature of the invention is to provide a removable access plate for coupling with a housing and which defines a wiring channel between the housing and the wall or ceiling.

A further feature of the invention is to provide an access plate adapter for use with an electrical assembly that forms a seal with the surface of the wall or ceiling.

Still another feature of the invention is to provide an access plate adapter that can be coupled to the access opening of an electrical assembly and has a height to extend between the electrical assembly and the wall or ceiling to prevent having exposed wires between the electrical assembly and the surface of the wall or ceiling.

The electrical assembly of the invention generally includes a housing with an outer wall having an access opening for electrical wiring. In one embodiment of the invention, the electrical assembly is a lighting fixture such as a surface mount trouffer having a housing with an open bottom side and one or more lamps or other light source for directing light through the open bottom. The housing can have one or more side walls and a top end wall. The top end wall can be mounted to the ceiling or wall directly or by means of a mounting bracket or fastener. Where the top end wall of the housing is spaced from the wall or ceiling, an access plate adapter is used to form a closed channel between the housing and the electrical junction box or between the opening in the wall or ceiling and the access opening in the housing.

The access plate is an adapter having a dimension to close the access opening of the housing of the electrical assembly and has a height to extend between the housing and the surface of the wall or ceiling. The access plate adapter can have a height of about ½ inch thick to about 1 inch although the height can vary depending on the intended use.

In one embodiment of the invention, the access plate adapter has a bottom wall adapted for coupling to the access opening of the housing of the electrical assembly. The access plate is formed with a drawn portion to form a side wall and a well with an open side opposite the bottom wall. Preferably, the side wall is continuous and has a height to extend away from the top end wall of the housing when the bottom wall is coupled to the housing. An end wall of the adapter extends outwardly from a top end of the side wall and extends around the periphery of the side wall. The end wall preferably has a dimension to form an electrical seal with the wall or housing to close the gap between the electrical assembly and the wall or ceiling.

These and other aspects of the invention are basically attained by providing an access plate adapter for closing an opening in an electrical housing. The adapter comprises a body having a substantially planar bottom wall and a side wall to define a well. The side wall has a first end integrally formed with the bottom wall. The bottom wall has a coupling member for coupling the adapter to an access opening of the electrical housing, and an access port to enable the passage of wires between the well and the electrical housing. An end wall extends outwardly from a second end of the side wall. The end wall surrounds the well and forms a substantially planar surface for forming a seal with a wall or ceiling surface.

The various features of the invention are also attained by providing an electrical assembly comprising a housing receiving an electrical device and having a wall adapted for mounting against a wall or ceiling. The housing wall has an opening adapted for electrical wiring to pass through. An access plate has a first end coupled to the wall of the housing and a second end adapted for contacting the wall or ceiling and defining a channel between the opening in the wall of the housing and the wall or ceiling for enclosing the wiring passing between the wall of the housing and the wall or ceiling.

The features of the invention are further attained by providing a method of mounting an electrical housing to a wall or ceiling. The method comprises the step of coupling an access plate to an opening in a wall of the electrical housing. The wall of the housing has an opening adapted for passing electrical wires between the housing and a power source. The access plate has a first open end coupled to the electrical housing to close the opening in the electrical housing and a second open end defining a channel between the first end and second end. The electrical housing is coupled to the wall or ceiling where the second end of the access plate is in contact with the wall or ceiling to form a sealed continuous channel between the wall or ceiling and the electrical housing.

These and other objects, advantages and salient features of the invention will become apparent from the following detailed description of the invention which, in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

Figure 1:
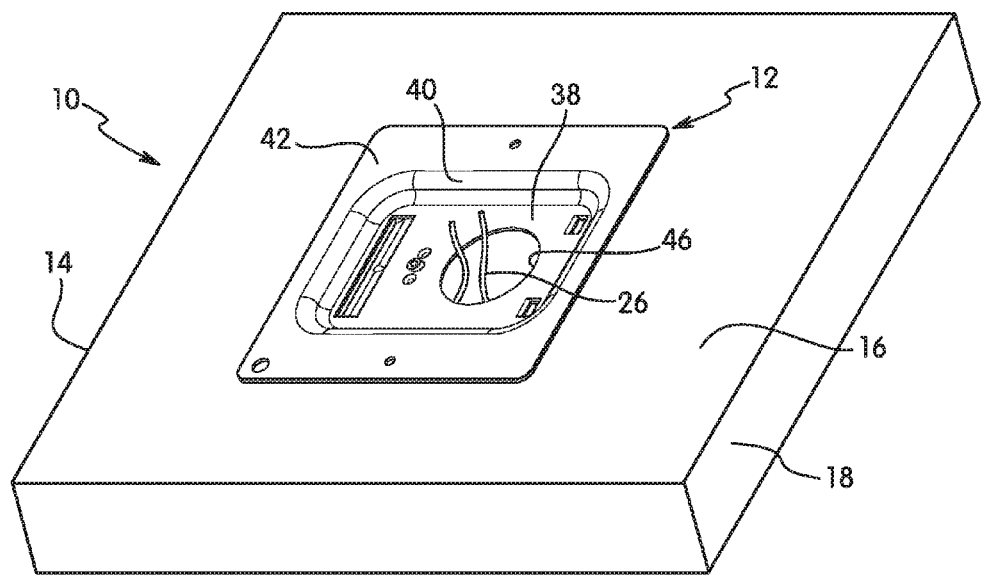
FIG. 1 is a perspective view of the electrical assembly and access plate in one embodiment of the invention.

The present invention is directed to an electrical assembly having a housing with an access opening and an access plate coupled to the housing to close the opening. The invention is particularly directed to an access plate adapter that can be coupled to the access opening in the housing and that has a height to extend between the housing and the wall or ceiling surface.

Referring to the drawings, the invention is directed to an electrical assembly such as a lighting assembly 10 and an access plate 12. In the embodiment illustrated, the electrical assembly is a lighting assembly that can be recessed or surface mounted. In alternative embodiments, the electrical assembly can be any number of known electrical devices such as emergency lights, signs, motion detectors or other electrical components. The lighting assembly can be a surface mounted trouffer fixture.

The lighting assembly 10 includes a housing 14 having a top wall 16 and side walls 18. An open bottom side 19 can have various lenses or shades as known in the art to direct light in a downward direction. The housing 14 includes a ballast 20 shown in FIG. 2 that is connected to the lamps. For simplicity, the lamps are not shown in FIG. 2 although it will be understood that various arrangements of lamps, reflector lens, shades and other components can be used as in conventional lighting assemblies. In one example, the lamps can be one or more fluorescent lamps connected to a respective lamp base that is mounted in the housing.

Figure 2:
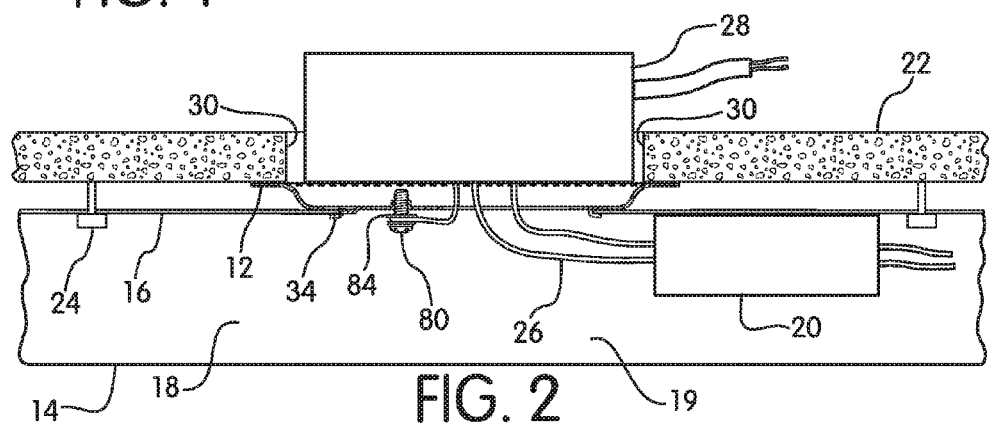
FIG. 2 is a partial cross-sectional view of the lighting assembly mounted to a ceiling and electrical box in the ceiling in a first embodiment of the invention.

The housing 14 can be attached to a wall or ceiling surface using various brackets and fasteners. In one embodiment, the housing is a surface mount trouffer fixture. As shown in FIG. 2, the housing 14 is attached to a ceiling 22 by fasteners 24 passing through the top wall 16 of the housing. Other means of mounting the lighting assembly to the ceiling can be used such as brackets as known in the art. The ballast 20 is connected to the power source by wires 26 extending from an electrical junction box 28. In the embodiment shown in FIG. 2, the electrical box 28 is mounted within the opening 30 of the ceiling 22 or directly above the opening in the ceiling. The wires are fed directly from the electrical box 28 through the opening in the access plate 12 to the ballast 20. In an alternative embodiment shown in FIG. 3, a cable clamp 32 is coupled to the access plate 12 to supply the wires from the power source to the ballast 20.

The top wall 16 of housing 14 has an access opening in the housing 14 for supplying electrical wiring into the housing. The access plate 12 of the invention is coupled to the top wall 16 to close the access opening 34 while allowing the wiring to pass through.

Figure 4:
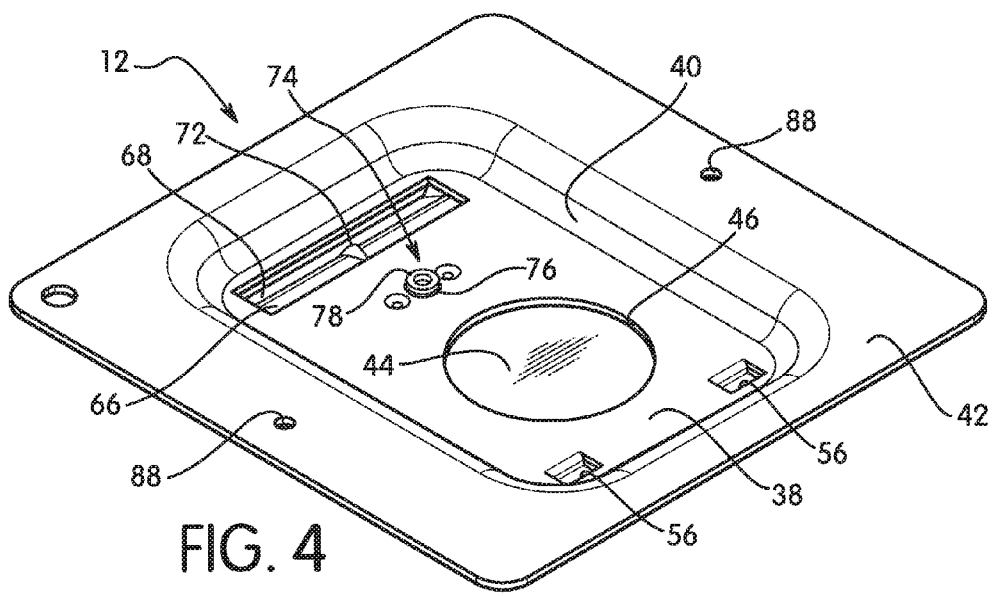
FIG. 4 is a top perspective view of the access plate adapter in one embodiment of the invention.
Figure 5:
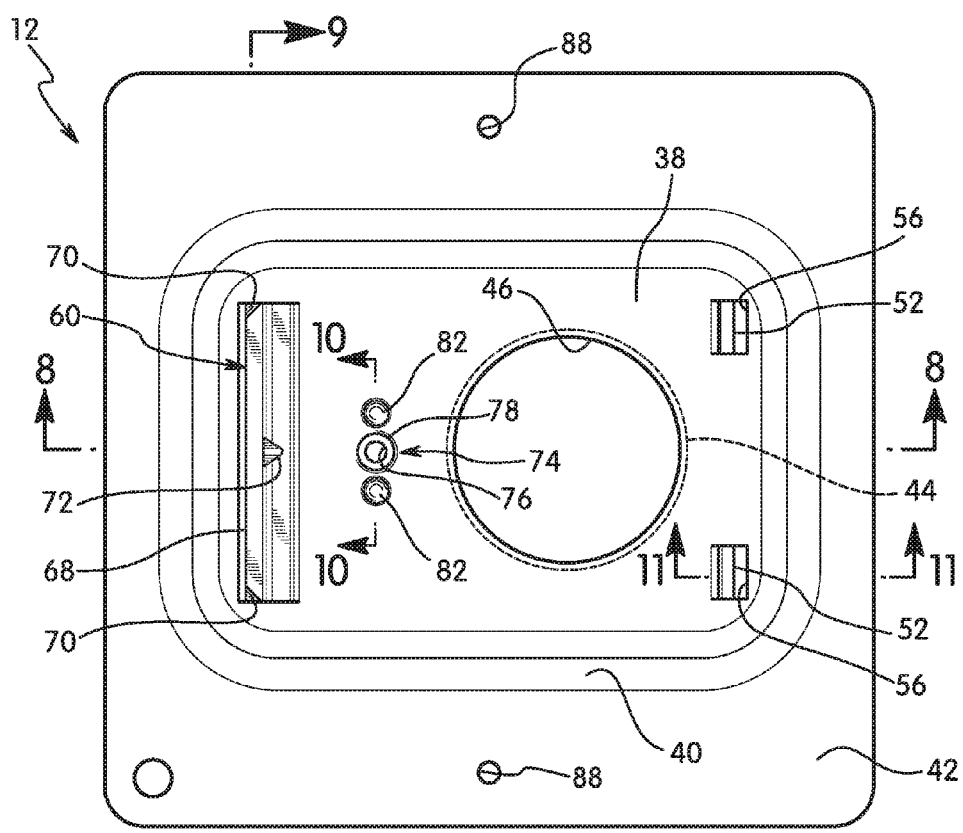
FIG. 5 is a top view of the access plate of FIG. 4.

Referring to FIG. 4, the access plate 12 has a length and width sufficient to close the access opening 34 in the housing 14. The access plate 12 has a body with a bottom wall 38 and a side wall 40, and a top or end wall 42. Bottom wall 38 has a substantially rectangular configuration in the embodiment shown corresponding to the shape and dimension of the access opening 34 in the top wall 16 of housing 14. The bottom wall 38 includes a knock-out 44 or pry-out plug that can be removed to form an opening 46. The opening 46 defines a passage for wires to pass directly from the electrical box 28 as shown in the embodiment of FIG. 2.

The access plate is preferably made of steel that is cut and stamped to the desired shade and dimensions. The steel is preferably 0.048 thick or more. The opening 46 in one preferred embodiment has a diameter of about 1.5 inches.

Figure 3:
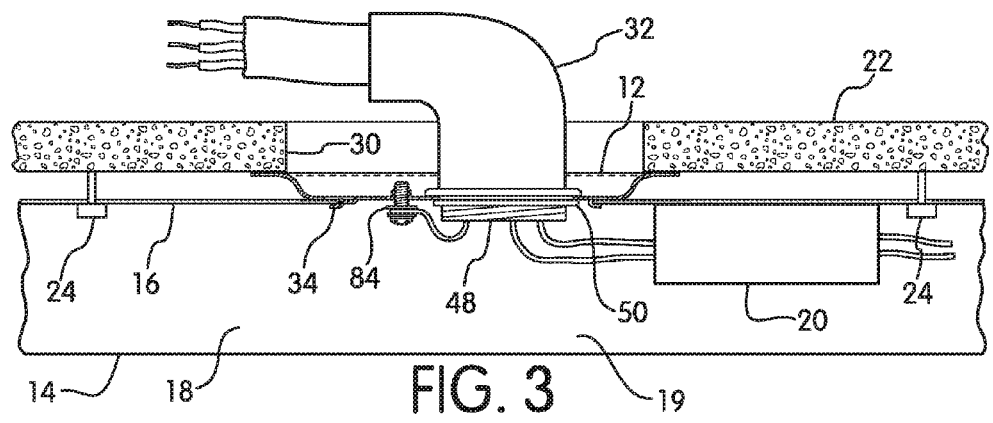
FIG. 3 is a partial cross-sectional view of the lighting assembly having a cable clamp for the wires in a second embodiment of the invention.

In alternative embodiments, an optional cable clamp 32 can be coupled to the access plate 12 as shown in FIG. 3. The cable clamp 32 typically has a threaded end 48 that is inserted through the opening 46. A lock nut 50 is threaded onto the threaded end to secure the cable clamp to the access plate for carrying wiring to the ballast or other electrical components within the housing 14. A clamp is provided to clamp to the cable and provide strain relief for the cable.

Figure 6:
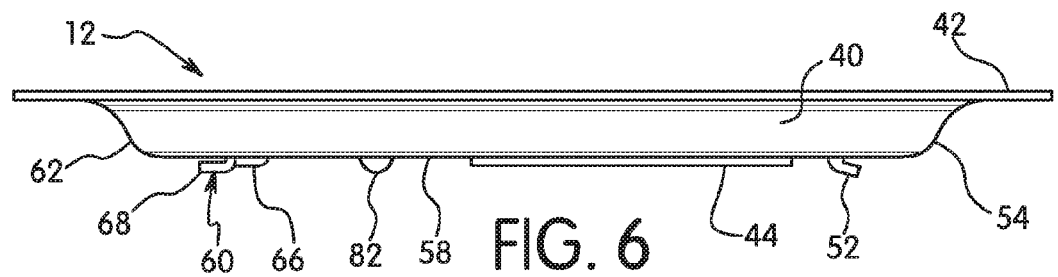
FIG. 6 is a side view of the access plate of FIG. 5.
Figure 8:
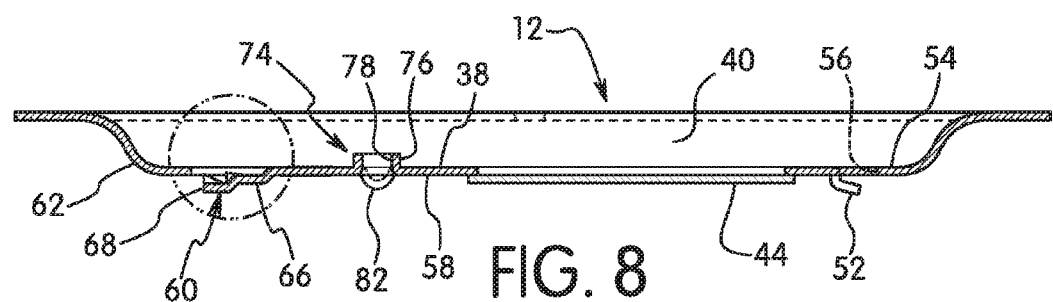
FIG. 8 is a cross-sectional view of the access plate taken along line 8-8 of FIG. 5.
Figure 9:
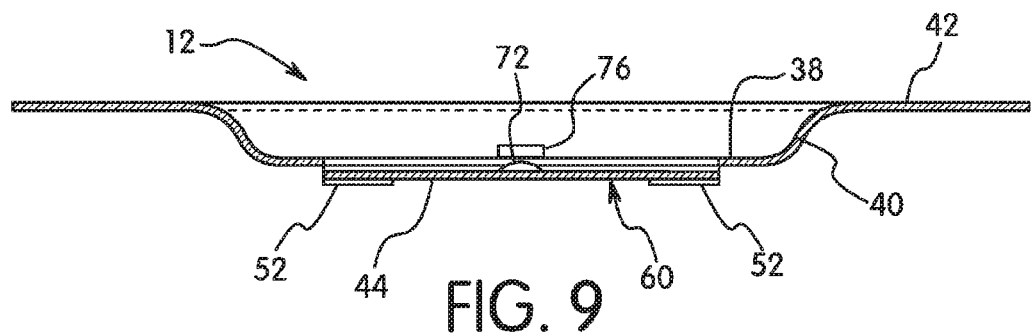
FIG. 9 is a cross-sectional view of the access plate taken along line 9-9 of FIG. 5 showing the mounting tab.

Bottom wall 38 is provided with coupling members for coupling the access plate 12 to the opening in the housing 14. In the embodiment shown, the coupling members include first tabs 52 formed at a first end 54 of the bottom wall 38. The tabs are cut or punched from the bottom wall to define an opening 56. The tabs 52 as shown in FIGS. 6 and 8 project outwardly with respect to the access plate toward the side wall 40. The tabs 52 extend from the bottom surface 58 a distance to form a hook-shaped coupling member for engaging the edge of the opening 46 in the wall 16 of the housing 14. The bottom wall 38 also includes a second coupling tab 60 at a second end 62 of bottom wall 38. The second tab 60 is cut or punched from the bottom wall to form an opening 64 so that the tab 60 extends downwardly and outwardly with respect to the bottom wall 38 and a width slightly less than the width of the access opening.

Figure 7:
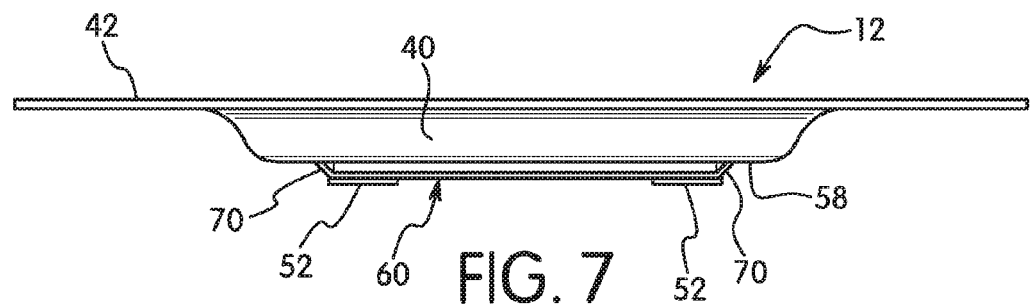
FIG. 7 is an end view of the access plate as seen from the left side of FIG. 5.

As shown in FIGS. 6, 7 and 8, the second tab 60 extends outwardly in a generally parallel plane with respect to the plane of the bottom wall 38 and has a length greater than the length of the first tabs 54. The second tab 60 has a width extending substantially the width of the bottom wall 38. As shown in FIGS. 7 and 8, the second tab 60 includes a first portion 66 coupled to the bottom wall 38 and a second portion 68 extending from the first portion 66. As shown in FIG. 8, the second portion is bent outwardly a distance greater than the distance of the first portion 66. The ends of the second portion have an upwardly bent corner 70 to form a projecting point. The first portion 66 includes a centrally located detent 72 extending in an upward direction to frictionally engage the edge of the access opening in the housing 14.

Figure 10:
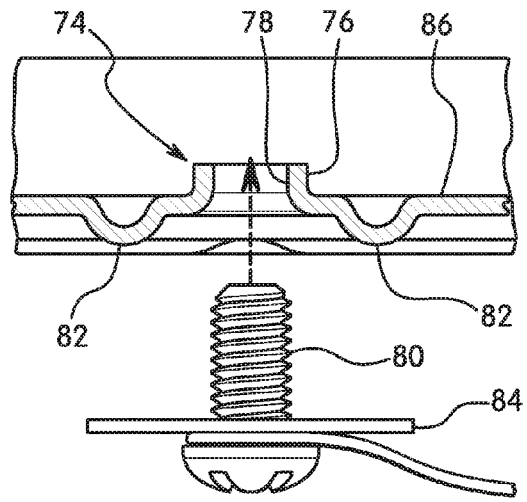
FIG. 10 is a cross-sectional view of the access plate taken along line 10-10 of FIG. 5 showing the ground screw mounting hole.
Figure 11:
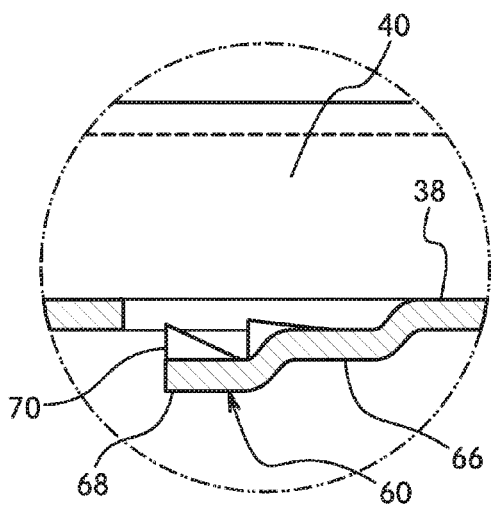
FIG. 11 is a cross-sectional view of the access plate taken along line 11-11 of FIG. 5 showing one of the coupling tabs.

Bottom wall 38 also includes a ground connection 74. The ground connection in the embodiment shown includes a collar 76 having an axial bore 78 extending through the collar 76 and the bottom wall 38. The axial bore can have internal threads for receiving a ground screw 80. Alternatively, the ground screw 80can be a self-tapping screw to cut threads in the axial bore 78. A pair of downwardly extending dimples 82 are formed on opposite sides of the axial bore 78 as shown in FIG. 10. The dimples 82 provide a contact surface for engaging a washer 84 on the ground screw 80.

The access plate 12 is preferably formed as a one piece unitary unit that is cut and stamped to the shape shown in FIG. 4. The side wall 40 is drawn from a blank of sheet material and can have a height of about ½ inch to about 1 inch. The side wall is preferably integrally formed as a one piece unit with the bottom wall 38. The side wall 40 is preferably continuous and extends around the peripheral edge of the bottom wall 38. In the embodiment shown, the side wall 40 extends upwardly from a top surface 86 of the bottom wall 38 at an incline. Alternatively, side wall 40 can be substantially perpendicular to the bottom wall 38.

The end wall 40 as shown in FIG. 4 extends radially outward from the side wall 40 and has a substantially flat planar configuration. The end wall 42 preferably has a dimension to overlie the opening 30 in the ceiling 22 as shown in FIGS. 2 and 3 or the wall or other support surface. End wall 42 can have one or more apertures 88 to receive a fastener for attaching the access plate 12 to the housing 14 or to the ceiling 22.

Figure 12:
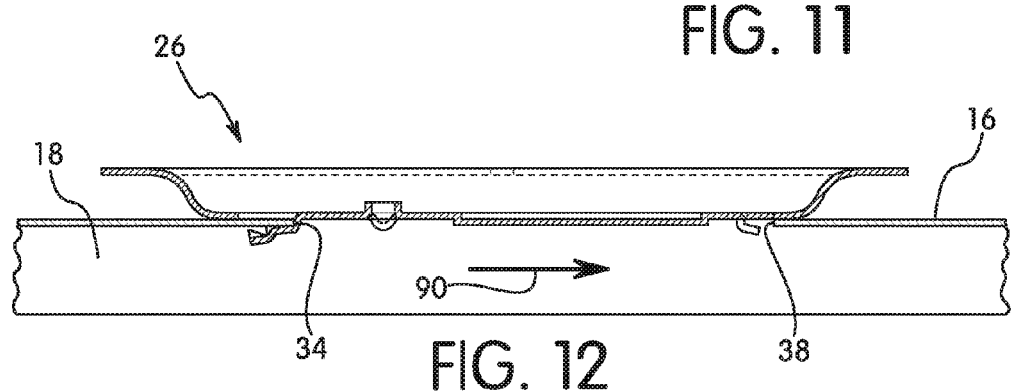
FIG. 12 is a cross-sectional view of the access plate and housing of the electrical assembly showing the access plate sliding into the access opening.
Figure 13:
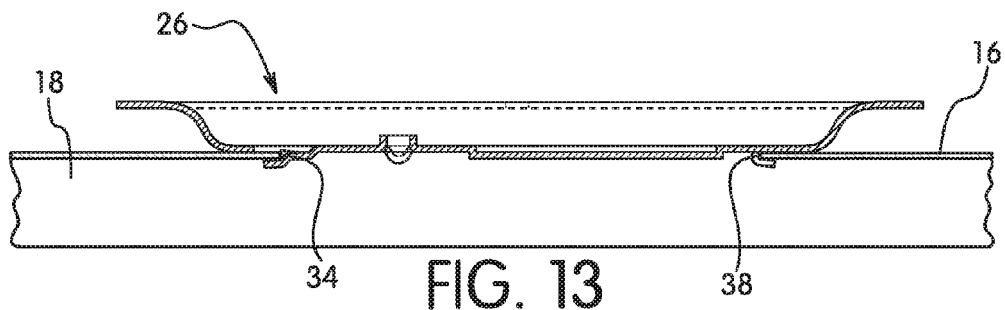
FIG. 13 is a cross-sectional view of the access plate and the housing of the electrical assembly showing the access plate coupled to the housing.

The access plate 12 forms an adapter that is connected to the housing of the electrical assembly to define a channel between the housing and the wall or ceiling to guide wires to the electrical assembly. The wires are passed through the opening 46 in the bottom wall 38 of the access plate 12 for connecting the electrical assembly to the power source as shown in FIGS. 1 and 2. The access plate is coupled to the housing 14 by inserting the second tab 60 below the surface of the top wall 16 of the housing until the edge of the opening contacts the edge portion of the tab 60 as shown in FIG. 12. The tabs 52 and 60 are spaced apart a distance to enable the first tabs 52 to extend into the opening 46 as shown in FIG. 12. The access plate can then slide in the direction of arrow 90 to engage the tabs 52 with the opposite edge of the opening 46 as shown in FIG. 13. The edges of the tabs 52 and 60 engage the edges of the opening 46 to grip the edges and retain the access plate in position. The upturned corners 70 of the tab 60 engage the surface of the housing wall so that the corner points frictionally engage the surface of the housing wall to resist movement of the adapter plate where the tab 60 is in the desired location.

The access plate adapter of the invention is particularly suitable for forming a channel between the top surface of the housing 14 to the bottom surface of the wall or ceiling 22 as shown in FIGS. 2 and 3. The end wall 42 preferably forms a seal around the opening 30 so that the wires and connectors passing between the electrical assembly 10 and the space above the ceiling 22 are enclosed by the side wall 40. The housing 14 is connected to the ceiling 22 in the embodiment shown by fasteners 24 where the top surface of the housing 14 is spaced from the face of the wall or ceiling. The gap formed between the wall or ceiling and the housing are enclosed by the access plate adapted 12.

Figure 14:
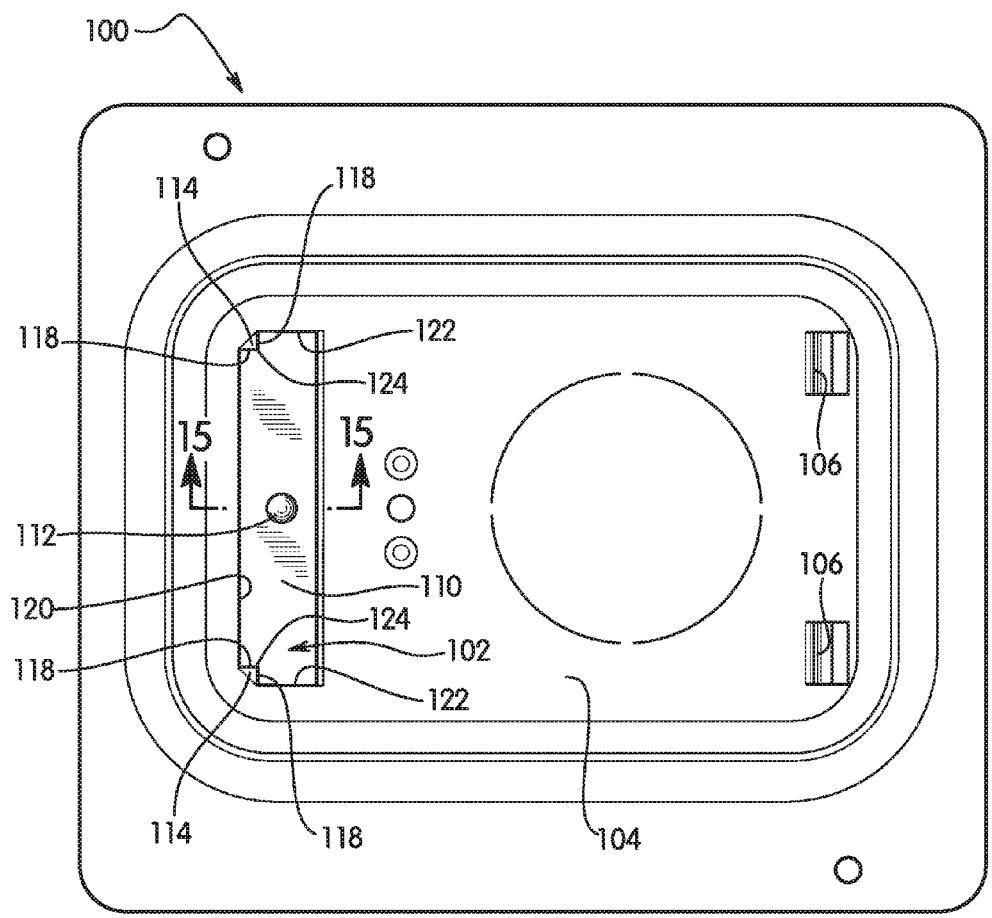
FIG. 14 is a top view of the adapter plate in a second embodiment of the invention.
Figure 15:
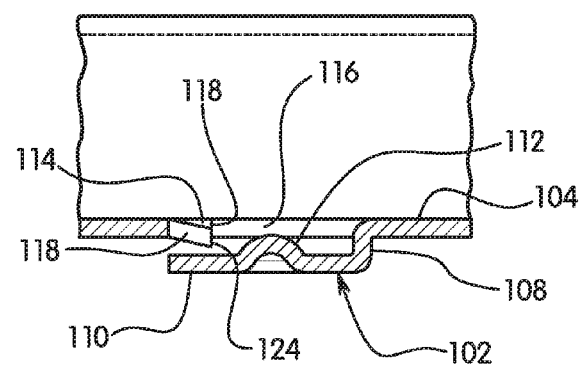
FIG. 15 is a cross sectional view of the adapter plate taken along line 15-15 of FIG. 14.

In a further embodiment shown in FIGS. 14 and 15 an adapter plate 100 is shown. The adapter plate 100 is similar to the adapter plate 12 with similar size and dimensions for coupling to the access opening in the housing of the lighting assembly and mating with the surface of the ceiling or wall.

The adapter plate 100 in the embodiment of FIGS. 14 and 15 includes a first coupling tab 102 at a first end of a bottom wall 104 and a pair of second compiling tabs 106 and a second end of the bottom wall 104. As in the previous embodiment, the coupling tabs 102 and 106 project in opposite directions for coupling with the access opening in the lighting assembly.

The coupling tab 102 in the embodiment shown is cut from the bottom wall 104 and bent to the shape and position shown in FIG. 15. The coupling tab 102 has a first leg 108 bent downwardly from the bottom wall 104 in a direction substantially perpendicular to the plane of the bottom wall 104. A second leg 110 extends from a distal end of the first leg 108 to extend in a plane substantially parallel to the bottom wall 104. The second leg no is spaced from the bottom wall 104 a distance corresponding to the thickness of the wall of the housing to couple with the housing.

The second leg no as shown in FIG. 14 has a substantially flat, planar shape with a dimple 112 formed in a middle portion. The dimple 112 extends toward the bottom wall 104 a distance to contact an inner surface of the housing of the lighting assembly to assist in gripping and frictionally engaging the housing of the lighting assembly.

Referring to FIG. 14, the coupling tab 102 is cut from the bottom wall 104 to form inwardly extending detents 114 at opposite corners of the opening 116 formed by cutting tab 102 from the bottom wall 104. The detents 114 are formed with perpendicular edges 118 extending inwardly from an end 120 of the opening 116 and sides 122 of the opening 116. The edges of the detents converge to a point 124 projecting inwardly into the opening 116. As shown in FIG. 15 the detents 114 are bent downward from the plane of the bottom wall 104 toward the second leg 110 of the tab 102.

The adapter plate 100 is coupled to the housing of the lighting assembly in a manner similar to the previous embodiment. The tab 102 is inserted into the opening in the housing so that the tab slides under the top wall of the housing. The leg 106 then slides under the top wall at the opposite end. The downwardly extending detents 114 and the upwardly extending dimple 112 engage and frictionally contact the top and bottom surfaces of the housing wall to hold the adapter plate in a fixed position coupled to the housing.

While various embodiments have been chosen to illustrate the invention, it will be understood by those skilled in the art that various changes and modifications can be made without departing from the spirit and scope of the invention as defined in the appended claims.

What is claimed is:

1. An access plate adapter for closing an access opening in an electrical housing, said adapter comprising:
   a body having a substantially planar bottom wall and a side wall to define a well, said side wall having a first end integrally formed with said bottom wall, said bottom wall having a coupling member projecting outwardly from said bottom wall for coupling said adapter to an access opening of the electrical housing, and an access opening including a knock-out to enable the passage of wires between said well and the electrical housing; and
   an end wall extending outwardly from a second end of said side wall, said end wall surrounding said well and forming a substantially planar surface for forming a seal with an outer surface of a wall or ceiling surface.

2. The access plate adapter of claim 1, wherein said coupling member comprises:
   a first tab formed at a first end on an outer surface of said bottom wall and extending in a first direction, and a second tab formed at a second end on the outer surface of said bottom wall and extending in a second direction, said first and second tabs being adapted for coupling with inner edges of the access opening of the electrical housing.

3. The access plate adapter of claim 1, further comprising:
   a threaded hole in said bottom wall adapted for receiving a ground screw.

4. The access plate adapter of claim 3, further comprising:
   a pair of dimples extending from said bottom wall on opposite sides of said threaded hole and adapted for contacting a washer associated with said ground screw.

5. The access plate adapter of claim 2, wherein said first tab has a length greater than a length of said second tab to allow said tabs to slide into engagement with said access opening in said electrical housing.

6. The access plate adapter of claim 5, wherein
   said first tab has a first portion extending parallel to said bottom with a first end coupled to said bottom wall and a second distal end, said first portion being spaced from said bottom wall, and
   a second portion coupled to said second distal end of said bottom wall and being spaced from said first portion a distance greater than said first distance.

7. An electrical assembly comprising:
   a housing enclosing an electrical device and having a housing wall adapted for mounting to a wall or ceiling, said housing wall having an opening adapted for electrical wiring to pass through; and
   an access plate having a first end including a first coupling member formed on an outer surface of said first end and extending in a first direction and a second coupling member formed on the outer surface of said first end and extending in a second direction for coupling said access plate to said housing wall, and a second end adapted for contacting an outer surface of the wall or ceiling and defining a channel between said opening in said housing wall and the wall or ceiling for enclosing the wiring passing between said housing wall and the wall or ceiling, said access plate having a dimension to space said housing from the wall or ceiling and close a gap between said housing and the wall or ceiling.

8. The electrical assembly of claim 7, wherein
   said housing includes a mounting member for coupling said housing to said wall or ceiling, said housing and said access plate second end forming a seal with said wall or ceiling, said access plate extending between said housing and said wall or ceiling.

9. The electrical assembly of claim 7, wherein said access plate comprises:
   a body having a side wall with an opening at said first end and an opening at said second end, said side wall defining said channel.

10. The electrical assembly of claim 9, wherein said access plate further comprises:
    a bottom wall having an opening therein with a dimension to allow wiring to pass through, and where said side wall extends upwardly from said bottom wall to form a well.

11. The electrical assembly of claim 10, wherein said access plate further comprises:
    an end wall at said second end substantially parallel to said bottom wall for contacting said wall or ceiling.

12. The electrical assembly of claim 11, wherein
said end wall extends outwardly from said side wall and surrounds said opening formed by said side wall.

13. The electrical assembly of claim 10, wherein
said first coupling member extends outwardly from said bottom wall.

14. The electrical assembly of claim 13, wherein
said first coupling member includes a first coupling tab at a first end of said bottom wall to define a first hook having a first length, and
said second coupling member includes a second coupling tab at a second end of said bottom wall to define a second hook extending in a direction opposite to said first hook and having a second length greater than said first length, said first and second hooks being adapted for coupling with opposite edges of said opening in said wall of said housing.

15. The electrical assembly of claim 14 wherein
said second coupling tab has opposite corners with an upturned detent.

16. The electrical assembly of claim 14 wherein
said second coupling tab is cut from said bottom wall to define an opening and where said opening has opposite corners with a downwardly projecting detent.

17. The electrical assembly of claim 10, wherein
said bottom wall includes a knock-out to form an opening in said bottom wall, a threaded hole adapted for receiving a ground screw, and a pair of dimples on opposite sides of said screw hole adapted for contacting a washer on said ground screw.

18. The electrical assembly of claim 7, wherein
said first coupling member comprising a first tab having a shape for engaging an edge of an opening in said housing.

19. The electrical assembly of claim 18, wherein
said second coupling member further comprises a second tab having a hook shape for engaging an edge of an opening in said housing and said second tab extending in a direction opposite said first tab.

20. A method of mounting an electrical housing to a wall or ceiling, said method comprising the steps of:
coupling an access plate having a side wall, a bottom wall at said first end and a top wall at said second end to an outer wall of an electrical housing, the bottom wall including a first tab at a first end forming a first coupling hook and a second tab at a second end of said bottom wall forming a second coupling hook, the outer wall of the housing having an opening adapted for receiving electrical wires, said access plate having a first open end coupled to said electrical housing to close said opening in said electrical housing and a second open end defining a channel between said first end and second end; and
coupling said electrical housing to said wall or ceiling where said second end of said access plate is in contact with an outer surface of said wall or ceiling to form a sealed continuous channel between said outer surface of said wall or ceiling and said outer wall of said electrical housing.

21. The method of claim 20, wherein
said electrical housing is spaced from said wall or ceiling, and
said access plate extends between said outer wall of said electrical housing and the outer surface of said wall or ceiling.

22. The method of claim 20, wherein
said bottom wall of said access plate has a threaded hole and a pair of dimples on opposite sides of said threaded hole, said method comprising:
threading a ground screw having a ground wire connected thereto into said threaded hole to make grounding contact with said access plate.

* * * * *